United States Patent [19]
Webb et al.

[11] 3,869,940
[45] Mar. 11, 1975

[54] VEHICLE WITH DIFFERENTIAL ASSEMBLY

[75] Inventors: Oswald Webb, Whitley; Brian Colin Pagdin, Sutton Coldfield, both of England

[73] Assignee: GKN Transmission Limited, Birmingham, England

[22] Filed: Jan. 8, 1973

[21] Appl. No.: 321,572

[30] Foreign Application Priority Data
Jan. 7, 1972    Great Britain..................... 721/72

[52] U.S. Cl................................... 74/711, 192/61
[51] Int. Cl.............................................. F16h 1/44
[58] Field of Search............ 74/711, 710, 785, 786; 142/61, 58; 252/75

[56] References Cited
UNITED STATES PATENTS

| | | | |
|---|---|---|---|
| 3,327,477 | 6/1967 | Stageberg | 192/61 |
| 3,332,302 | 7/1967 | Watermann | 192/61 |
| 3,505,904 | 4/1970 | Williams, Jr. | 74/710 |
| 3,605,523 | 9/1971 | O'Brien | 74/711 |
| 3,640,872 | 2/1972 | Wiley et al. | 252/75 |
| 3,748,928 | 7/1973 | Shiber | 74/711 |

*Primary Examiner*—Wesley S. Ratliff, Jr.
*Attorney, Agent, or Firm*—Spencer & Kaye

[57] ABSTRACT

The specification discloses a vehicle in which there is between the prime mover and the axle or axles, a free member differential gearing arranged within a control coupling which has elements connected to members of the gearing to control relative rotation between the members. The coupling comprises elements in the form of plates or similar members rotatable in a chamber filled with a viscous liquid.

13 Claims, 6 Drawing Figures

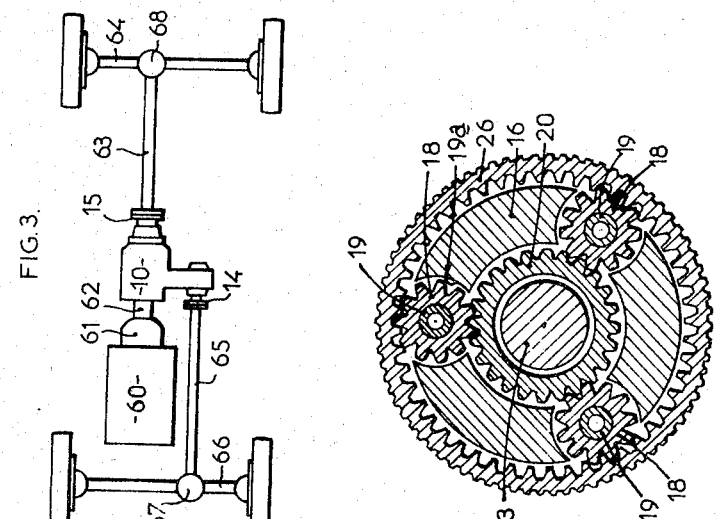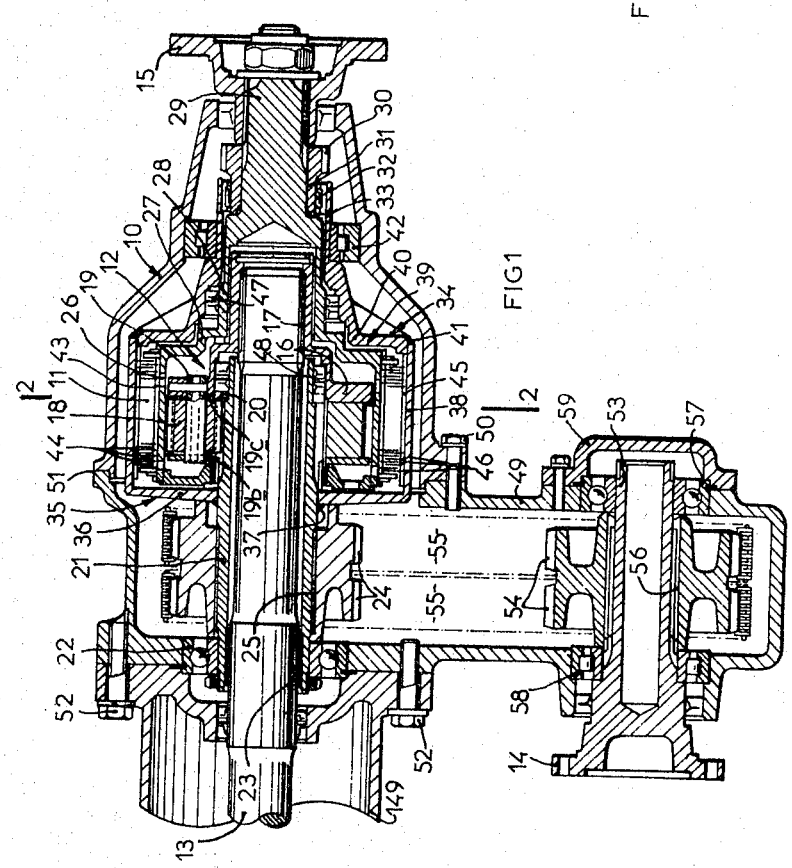

VEHICLE WITH DIFFERENTIAL ASSEMBLY

BACKGROUND OF THE INVENTION
1. Field of the Invention

This invention relates to a vehicle including an assembly, hereinafter referred to as an assembly of the kind specified, of a differential gearing and means to control relative rotation between two members of the gearing, such means being hereinafter referred to as a "control coupling." The assembly is inserted either between the two driven axles of a four-wheel-drive vehicle or between the two parts of a single driven axle and also serves to transmit drive from the vehicle prime mover to the vehicle axles or axle parts as the case may be.

2. Description of the Prior Art

It has previously been proposed to provide a vehicle including an assembly of the kind specified comprising, in co-axial, side by side relation, an epicyclic gearing and a control coupling comprising two sets of annular elements or plates, the plates of one set being interleaved with the plates of the other set and the plates of one set being drivingly connected to one member of the gearing and the plates of the other set being drivingly connected to another member of the gearing, the plates working in a fluid which serves to transmit torque between the plates of the two sets in the event of a mutual speed difference between them.

While this previously proposed arrangement is generally satisfactory, the assembly is somewhat bulky and thus difficult to fit to existing vehicles. Moreover, the arrangement fails to realise the full torque transmitting potential of the control coupling. In addition, the churning losses of the differential gearing relative to the casing of the assembly represent a useless consumption of power and cause the assembly to heat up.

It is an object of the invention to provide a vehicle having a compact and efficient assembly of the kind specified.

SUMMARY OF THE INVENTION

According to the invention we provide a vehicle including an assembly of the kind specified comprising a control coupling including first and second elements (or sets of elements) relatively rotatable in a viscous liquid (as hereinafter defined) about a common axis, the elements being annular and spaced from said axis to provide a space thereabout, a three-member differential gearing located in said space and driving connections between the first and second elements (or sets of elements) respectively and two members of the differential gearing; and further driving connections between the vehicle prime mover and one member of the gearing and between the other members of the gearing respectively and either the parts of a single driven axle or two driven axles.

By viscous fluid we mean a fluid having a viscosity of between 1,000 and 100,000 centistokes at 20°C with a zero shear rate.

By placing the differential gearing within the control coupling a compact assembly is obtained. Moreover, the greater the radius at which the elements of the control coupling interact, other things being equal, the greater the torque transmitted by the coupling and the greater the control exerted by the coupling on the differential gearing.

The torque transmitted by the control coupling will be approximately proportional to the viscosity of the fluid in the coupling, approximately proportional to the member of elements in the coupling and approximately proportional to the fourth power of the mean radius of the elements about the axis of mutual rotation of the elements.

The torque transmitted is approximately equal to the fourth power of the mean radius of the elements because (1) the torque transmitted is approximately proportional to the surface area of the elements which in turn is porportional to the second power of the mean radius; (2) is approximately proportional to the slipping velocity between the elements which in turn is porportional to the radius and (3) is approximately porportional to the drag between the elements which is also approximately proportional to the mean radius.

Preferably, the members of the differential gearing also work in a viscous fluid and the planet members of the gearing are arranged to pump the fluid along paths which resist the flow of the fluid. Normally these paths will be constituted by small clearances between parts of the gearing which will be dimensioned to provide the necessary resistance characteristics. The paths may include automatically operated pressure relief valves to prevent the build up of excessive pressure in the assembly. As a result of this pumping the viscous fluid in the differential gearing serves to transmit torque between the members of the differential gearing thus to exert some control on the relative rotation of the members of the gearing in addition to the control exerted by the control coupling.

An advantage of this arrangement, as compared with that previously proposed, is that the churning losses between the members of the gearing which occurred in the differential gearing in the previous construction are put to some use in controlling relative rotation between the members of the gearing.

The elements of the control coupling and the members of the differential gearing may work in the same chamber which contains the required viscous fluid. This fluid will also act as a lubricant for the differential gearing.

The differential gearing may be of the epicyclic type and in such case the planet members may rotate in closely fitting pockets in the planet carrier so as to effect said pumping of the viscous fluid.

In a preferred arrangement, the input from the vehicle prime mover is to the planet carrier of the differential gearing and the outputs to the axles or axle parts are from the sun gear and annulus gear of the epicyclic gearing. Where the assembly is being used on a four-wheel-drive vehicle, the output to the front wheels is preferably taken from the sun gear of the gearing.

When using a differential gearing of epicyclic form, the annulus gear can provide one of the elements of the control coupling or carry one such element or set of elements. Where the annulus gear itself forms an element of the control coupling then it may rotate closely within a housing which is drivingly connected to another part of the gearing, for example the sun gear.

The annulus gear can carry a series of annular plates lying in planes normal to the rotary axis of the gear and forming one set of elements of the control coupling and be surrounded by a housing which carries similar annular plates which form the other set of elements of the control coupling, the elements of the two sets being interleaved.

Alternatively the annulus gear may carry a plurality of cylindrical projections of different diameters and which form one set of elements, the housing carrying cylindrical projections which are interleaved with those carried by the annulus gear and which form the other set of elements.

In these arrangements the housing may be of sealed construction except for a running seal between a shaft and the housing radially inwardly of the elements. By arranging this seal radially inwardly of the elements it is not subjected to the high pressure to which it would be subjected were it at the same radius as the elements. Moreover the housing preferably has an externally smooth profile to cut down churning losses of the assembly relative to the casing in which it is housed.

In an alternative arrangement, a bevel-type differential gearing may be used and in such an arrangement there may be two co-axial shafts carrying the bevel gears and a planet carrier in the form of a cage carring the planet gears connected to a third coaxial shaft received within one of said first-mentioned co-axial shafts. In this arrangement the cage is preferably connected to the vehicle prime mover and the bevel gears to the axles or axle parts.

While it is preferred to place the control coupling between the two outputs of the differential gear the control coupling can be between any two members of the gear. Indeed, there may be more than one control coupling. Thus there may be two or three control couplings each drivingly connected between a different pair of members of the differential gear.

Three embodiments of the invention will now be described in detail by way of example with reference to the accompanying drawings in which:

BRIEF DESCRIPTION IF THE DRAWINGS

FIG. 1 is a longitudinal section through an assembly for use in a four-wheel-drive vehicle embodying the invention;

FIG. 2 is a section on the line 2—2 of FIG. 1;

FIG. 3 is a diagram of a four-wheel-drive vehicle embodying the invention;

DESCRIPTION OF THE PREFERRED EMBODIMENTS

Figure 4:
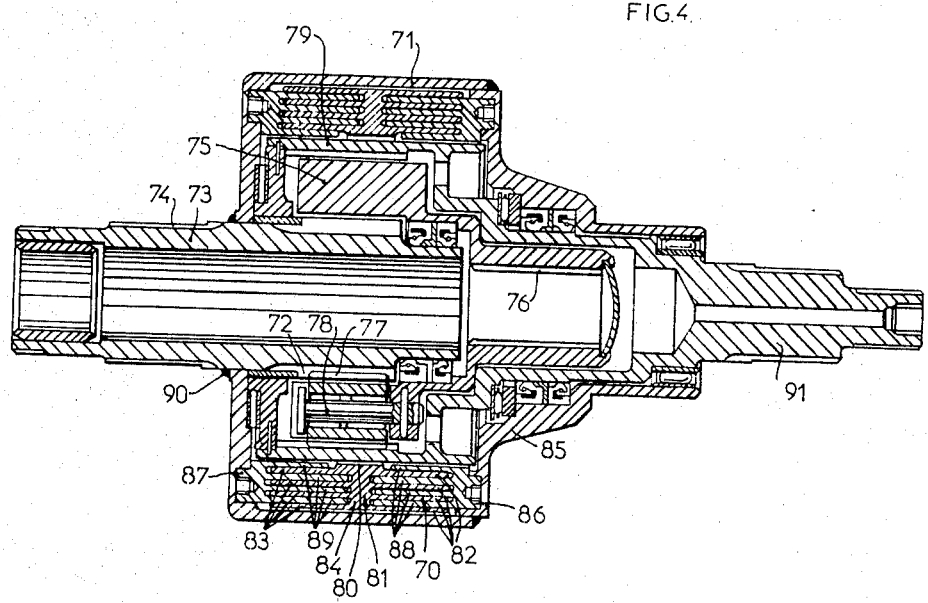
FIG. 4 is a longitudinal section through part of an assembly similar to that shown in FIG. 1 but having a different form of control coupling.

Referring now to FIG. 1, the assembly comprises a casing 10 within which is mounted a control coupling indicated generally at 11 and a differential gearing of epicyclic form indicated generally at 12. The assembly is intended for use in a four-wheel-drive vehicle and has an input shaft 13 which is driven by the vehicle prime mover and which may be the output shaft of the conventional gear box. There is a first output connection 14 which is intended to be connected to the front wheels of the vehicle and a second output connection 15 which is intended to be connected to the rear wheels of the vehicle. The connections are described below with reference to FIG. 3.

Referring particularly to the differential gearing 12, the input to this gearing is by means of a planet carrier 16 which is splined at 17 to the input shaft 13. Mounted in the planet carrier and equiangularly spaced about the shaft 13 are three planet gears 18 each mounted on a pivot pin 19 which is mounted in the planet carrier. The planet carrier comprises a generally cylindrical member which is provided with axially extending pockets 19a which are shaped closely to fit the planet gears 18 so that there is only a small clearance between the periphery of each gear and the planet carrier itself. The planet carrier includes an end plate 19b which closes the pockets and the ends of the planet gears are closely spaced from the bases 19c of the pockets and the end plate 19b. The gears 18 serve to pump fluid as will be described below through the clearance between the gears 18 and the generally cylindrical walls of the planet carrier pockets 19a, escape of the fluid axially of the gears being prevented by the bases 19c and end plate 19b.

The sun gear of the differential gearing is indicated at 20 and is formed on a hollow shaft 21 which is rotatably mounted in a bearing 22 while needle rollers 23 are interposed between the shaft 21 and the input shaft 13. If desired a plain bronze or other bearing may be used. The shaft 21 carries a pair of chain sprockets indicated at 24, the chain sprockets being splined at 25 to the shaft. The annulus gear of the differential gearing is indicated at 26 and is drivingly connected by a disc 27 and a sleeve 28 to an output shaft 29 on which the output connection 15 is fixed. The output shaft 29 carries a speedometer sprocket 30 having a sleeve 31 which runs in a bearing 32 supported within a sleeve 33 forming part of a housing indicated generally at 34.

The housing 34 forms part of the control coupling 11 and is formed of a first part 35 which has an annular disc 36 welded at 37 to the shaft 21 and a cylindrical portion 38. The housing 34 also includes a second part indicated generally at 39 which includes a disc 40 welded at 41 to the cylindrical portion 38 and a sleeve 33 which is mounted in a roller bearing 42 in the housing 10. It will be noted that the housing 34 has a smooth external profile to minimise churning losses between the housing and the casing when the gear is in operation.

The outer surface of the annulus gear 26 is splined as indicated at 43 and carries a plurality of annular discs or elements, some of which are indicated at 44. The inner surface of the cylindrical portion 38 is splined at 45 and carried a plurality of annular discs or elements some of which are indicated at 46. The discs 44 comprises a first set of discs and are interleaved with the discs 46 which constitute a second set of discs.

There is a running seal 47 between the second part 39 of the housing 34 and the sleeve 28. There is a further running seal 48 between the planet carrier 16 and the shaft 21. The whole of the housing 34 is filled with a viscous fluid as defined above, that is to say a fluid having a viscosity of between 1,000 and 100,000 centistrokes at 20°C and at zero shear rate. This viscous fluid serves to transmit torque between the discs 44 and 46 and also lubricates the differential gearing. Moreover, as described above, due to the small clearances between the planet gears 18 and the pockets 19a in the planet carrier 16 viscous fluid is pumped through the arcuate clearances between the peripheries of the gears 18 and the pockets 19a, these clearances provide resistance to the flow of the fluid, whereby torque is transmitted between the parts of the epicyclic gearing. If desired special paths may be provided for this pumped fluid, the paths having the resistance characteristics required. Automatic blow-off valves (not shown) may also be provided.

At the left hand end of the casing 10 there is a further casing 49 which is bolted to the casing 10 by a ring of bolts 50. There is a flat, annular interface 51 between the casings which can receive a circular gasket.

The casing 49 mounts the bearing 22 referred to above and is secured by bolts 52 to the rear end of the gear box via an adaptor 149.

The casing 49 carries, at its lower end in FIG. 1, a short output shaft 53 with which the output connection 14 is integral. The shaft has splined thereto two chain sprockets 54 which are connected by means of two chains 55 with the sprockets 24. The sprockets 54 are splined at 56 to the shaft 53, the latter being mounted in bearings 57 and 58 in the casing 49. A cap 59 is secured to the casing in alignment with the end of the shaft 53 and an anti-skid braking sensor can be connected to the shaft 53 if desired in place of the cap 59.

The assembly thus far described is connected in a four-wheel-drive vehicle as shown in FIG. 3, with the input shaft 13 receiving the drive from the prime mover 60 through clutch 61 and gear box 62 and the output connection 15 being connected at 63 to the rear axle 64 and the output connection 14 being connected at 65 to the front axle 66. Under normal circumstances, the front and rear wheels of the vehicle will be arranged to rotate at substantially the same speed and thus there will be little or no relative movement of the parts of the differential gearing 12. If, however, a considerable speed difference should occur between the front and rear wheels, due to one set of wheels skidding or locking, there will be relative movement between the parts of the differential gearing and this movement will be controlled by the control coupling 11 so that there will be some torque feedback to the slipping wheels in a manner which is in itself known.

The particular arrangement shown in the drawings is particularly advantageous since it is compact, thus the differential gearing 12 is located within the control coupling 11. This cuts down the axial length of the assembly.

Furthermore, the control coupling is efficient since the discs 44 and 46 are of comparatively great radius and as explained above the greater the radius the more efficient the coupling.

By virtue of including a viscous fluid in the housing 34 which is pumped by the planet gears 18, the resistance to flow of the viscous fluid through the small clearances in the gear itself provides some control of the relative movement of the members of the differential gearing in addition to the control exerted on relative movement by the control coupling.

Moreover, the arrangement of the housing 34 is advantageous since comparatively high pressures are generated in the viscous fluid in the outer part of the housing and, by the construction shown, running seals at 47 and 48 are arranged at the radially inner parts of the housing and thus do not have to withstand high hydraulic pressures. The position of maximum loading is closed by the weld 41 and if necessary for servicing this weld can always be turned off and the housing opened.

The casing 49 may be arranged in any one of a number of positions relative to the casing 10 by virtue of the dispositions of the holes which receive the bolts 52. Thus the casing 49 may be turned around the axis of the shaft 13 to any one of a number of positions and bolted to the housing 10 in that position.

It is possible to allow, by varying the chain sprockets 24 and 54, for any mismatch between the front and rear differentials 67 and 68 of the vehicle. Thus the front differential 67 may be incorporated in an engine such as 60 and may be standard for a number of different vehicles having different rear wheel differentials so that in order for there to be little or no relative movement in the differential gearing 12 during normal running some compensation is necessary and this is effected by changing the sprockets 24 and 54.

FIG. 4 shows part of an assembly similar to that shown in FIG. 1 but with a different form of control coupling. In FIG. 1, the control coupling is provided by the plates 44 and 46 which are arranged in planes substantially normal to the rotary axis of the assembly. In FIG. 4, the control coupling is provided by cylindrical projections carried by the annulus gear of the epicyclic gearing which are interleaved with cylindrical projections carried by a housing within which the control coupling and the differential gearing is mounted.

The construction of FIG. 4 is generally similar to that of FIG. 1 and therefore will not be described in such detail. There is a control coupling indicated generally at 70 mounted within a housing 71. The sun gear of epicyclic gearing is indicated generally at 72 and is formed integrally with a hollow shaft 73 which is splined at 74 and which provides one output. This may have chain sprockets such as 24 applied thereto as described in relation to FIG. 1. The gearing comprises a planet carrier 75 which is internally splined at 76 to receive an input shaft such as a shaft 13 in FIG. 1. Planet gears 77 are rotatably mounted on pivot pins 78 in the planet carrier and mesh with the sun gear and with an annulus gear 79.

Surrounding the annulus gear and splined thereto at 80 is a member 81 having a plurality of cylindrical projections 82 and 83 extending in opposite directions from a central portion 84 thereof. Fixed to a housing 85 which is constructed in a manner similar to the housing 34 of FIG. 1, are two members 86 and 87 respectively which have cylindrical projections which are interleaved with the projections 82 and 83. Thus the member 86 has cylindrical projections 88 which are interleaved with the projections 82 and the member 87 has cylindrical projections 89 which are interleaved with the projections 83.

The housing 85 is filled with a viscous liquid in the manner described above in relation to FIG. 1 which acts in shear between the cylindrical projections 82 and 88 on the one hand and 83 and 89 on the other hand to control relative movement between the housing 85 which is welded at 90 to the shaft 73 and the annulus gear 79 which is splined to the member 81. The annulus gear is connected to the output shaft 91. The operation of the embodiment of FIG. 4 is similar to the operation and the embodiment of FIG. 1 with the cylindrical projections taking the place of the annular plates 44 and 46. It will be appreciated that the arrangement shown in FIG. 4 will be arranged in a housing such as a housing 10 of FIG. 1 and connected to an input shaft described and the outputs will be taken from the shafts 73 and 91 in the manner described in FIG. 1 or in any other convenient manner.

Figure 6:
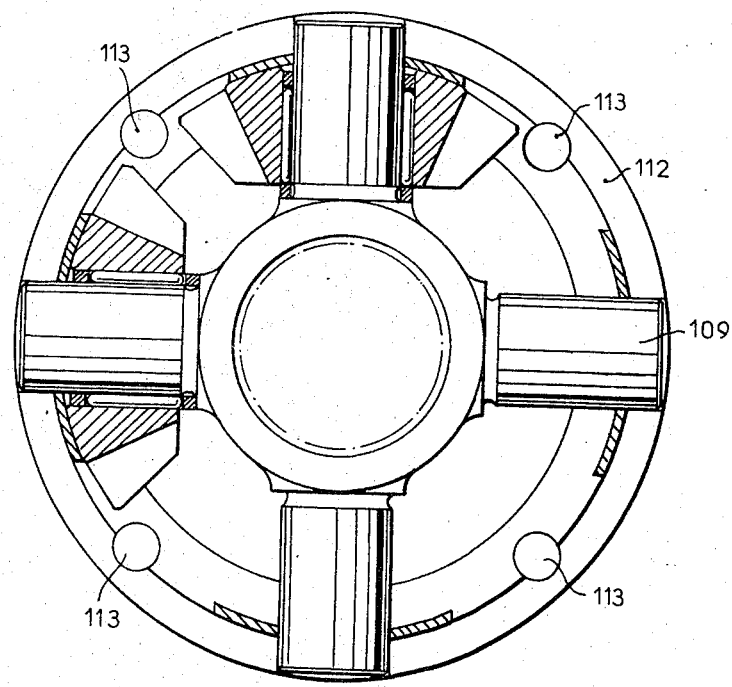
FIG. 6 is a partial section on FIG. 5 on the line 6—6 thereof.
Figure 5:
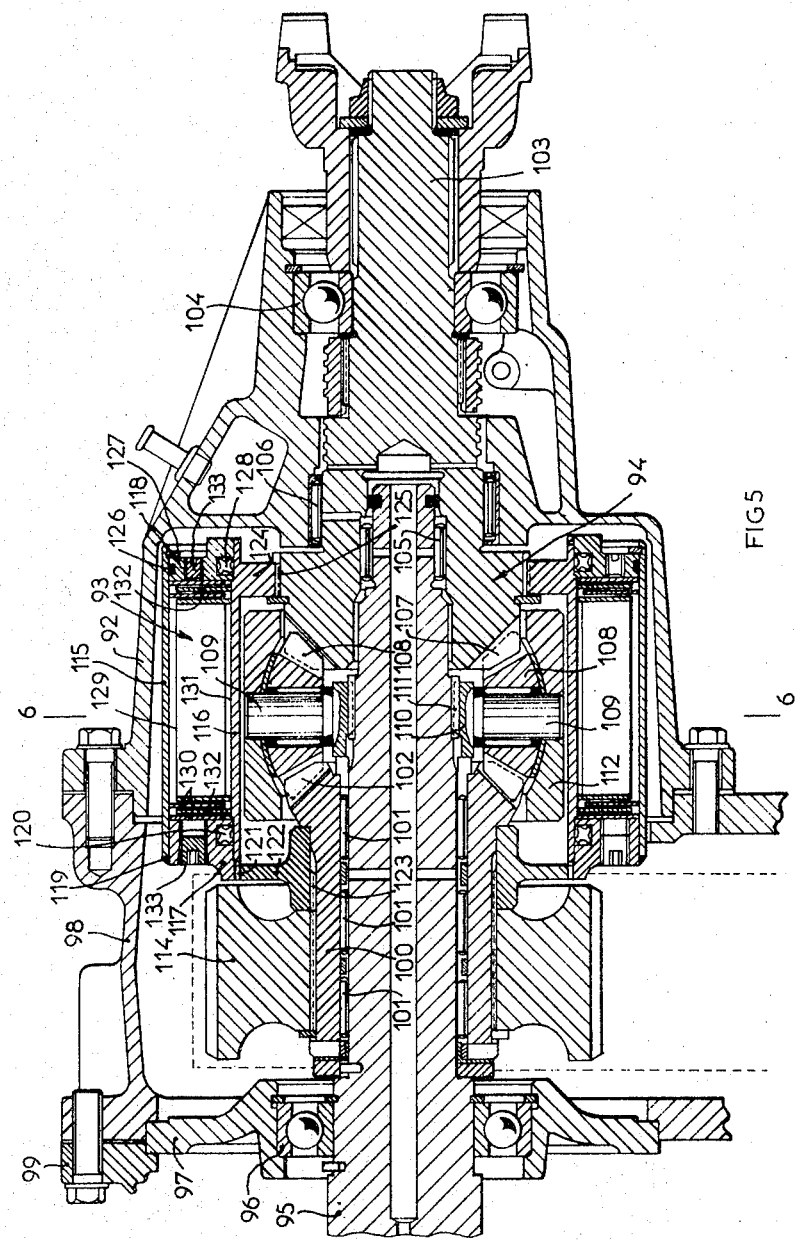
FIG. 5 is a section similar to FIG. 1 of an assembly including a bevel type differential gearing.

Referring now to FIGS. 5 and 6, this shows an assembly using a bevel type differential gearing. The assembly is mounted in a casing 92 and comprises a control coupling indicated generally at 93 and a bevel type differential gearing indicated generally at 94. The control coupling is of the same general type as that described in relation to FIG. 1.

The assembly comprises an input shaft 95 which is carried in a bearing 96 which in turn is mounted in a web 97. The web 97 is located between a further casing 98 and and an adaptor 99 whereby the assembly can be connected to a conventional gear box. Surrounding the input shaft 95 is a first coaxial shaft 100 which is rotatably mounted on the input shaft 95 by means of rollers 101. The shaft 100 is formed at its right hand end with a bevel gear 102. A second coaxial shaft 103 is mounted in the casing 92 by means of a bearing 104 and is counterbored to receive the right hand end portion of the input shaft 95 which is supported by a roller bearing 105. The shaft 104 is also supported in the housing 92 by a further roller bearing 106. At its left hand end, the shaft 103 is formed with a bevel gear 107.

The bevel gears 102 and 107 mesh with four planet gears 108 rotatably mounted on pins 109 forming part of an internal carrier 110 which is splined at 111 to the input shaft 95. The outer ends of the pins 109 are received in a two part external carrier 112, the parts being held together by bolts 113.

The first coaxial shaft 100 carries a chain sprocket 114 which can be connected to a chain and a first output as described in relation to the arrangement of FIG. 1.

The control coupling 93 comprises an outer cylinder 115 and an inner cylinder 116, an annular end piece 117 and a further annular end piece 118. The cylinders 115 and 116 and the end pieces 117 and 118 define an annular space which is filled with a viscous liquid as defined above. The end piece 117 is welded at 119 to the outer cylinder 115. The end piece 117 carries a seal 120 which engages the inner cylinder 116. The end piece 117 is splined at 121 to a disc 122 which in turn is splined at 123 to the first coaxial shaft 100. The cylinder 115 thus rotates with the first coaxial shaft 100.

The inner cylinder 116 has an internal flange 124 at its right hand end which is splined at 125 to the second coaxial shaft 103. The inner cylinder 116 will thus rotate with the second shaft 103. The end piece 118 carries a seal 126 which engages the outer cylinder 115 and the end piece is held in the outer cylinder by means of a circlip 127 and there are formations, not shown, which prevent the end piece 118 rotating relative to the outer cylinder 115. There is a running seal 128 between the end piece 118 and the inner cylinder 116.

The outer cylinder 115 is internally splined at 129 and engaged with the splines are a number of annular plates 130 which are generally normal to the rotary axis of the assembly. The inner cylinder 116 is externally splined at 131 and carries a number of plates, some of which are shown at 132 and which are interleaved with the plates 130. The annular space within which the plates 130 and 132 are received is filled with viscous fluid through filling plugs 133.

It is believed that the operation of this embodiment will be readily understood in view of the foregoing description of the operation of the embodiment of FIG. 1. There will thus be an input applied to the shaft 95 which will drive the planet carrier 110 and which in turn will drive the coaxial shafts 100 and 103 through the planet gears 108 and the bevel gears 102 and 107. Relative rotation between the coaxial shafts 100 and 103 will be controlled by means of the control coupling 93 comprising the annular plates 130, 132 which are connected to rotate with the shafts 100 and 103 respectively as described above. The outputs from the assembly will be taken from the shaft 103 and the chain sprocket 114 in the manner described in relation to FIGS. 1 and 3. In the embodiment of FIGS. 5 and 6 it will be necessary to provide separate lubrication for the differential gearing by way of various lubrication passages which are shown in the drawing but which are a generally conventional arrangement and are therefore not described in detail. In this arrangement the differential gearing will not be lubricated by viscous fluid which fills the control coupling.

In a further modification, instead of using a control coupling with cylindrical projections 82, 88 and 83, 89 the annulus of the differential gear such as 79 in FIG. 4 may fit with small clearance within a housing such as 85 and the control coupling may be constituted by these two parts with a viscous fluid between them.

It is envisaged that when using a differential gearing of epicyclic form it may be possible to dispense with the planet gear pivot pins and by grinding the teeth of the planet gears cause these to engage the cylindrical surfaces of the pockets in the planet carrier so that the teeth act as planet gear bearings.

The invention can be applied between the parts of a single driven axle as well as between two driven axles as specifically described.

It will be seen that the invention provides, in a self propelled vehicle, an assembly for controlling the relative rotation between the two driven axles or between the parts of a single axle and which is extremely compact and efficient.

We claim:

1. A vehicle including a prime mover, axles or axle parts drivable by the prime mover, a three-member differential gearing of epicyclic type including planet elements mounted in a planet carrier, a control coupling connected between two-members of the gearing to control relative rotation between said members, the coupling including first and second elements relatively rotatable in a viscous fluid having a viscosity of between 1,000 and 100,000 centistokes at 20°C with a zero shear rate about a common axis, the elements being annular and spaced from said axis to provide a space thereabout and said differential gearing being located in said space, driving connections between the first and second elements respectively and two members of the differential gearing, and further driving connections between the vehicle prime mover and one member of the gearing and between the other members of the gearing respectively and either the parts of a single driven axle or two driven axles.

2. A vehicle according to claim 1 wherein the members of the differential gearing also work in a viscous fluid having a viscosity of between 1,000 and 100,000 centistokes at 20°C with a zero shear rate and the planet elements of the gearing are arranged to pump the fluid along paths which resist the flow of the fluid.

3. A vehicle according to claim 2 wherein the paths include automatically-operated pressure relief valves.

4. A vehicle according to claim 2 wherein the elements of the control coupling and the members of the differential gearing work in the same chamber.

5. A vehicle according to claim 2 wherein the planet elements rotate in closely fitting pockets in the planet carrier so as to effect pumping of the viscous fluid along said paths.

6. A vehicle according to claim 1 wherein the planet elements are bevel gears and the differential gearing includes two coaxial shafts carrying further bevel gears which mesh with the first mentioned bevel gears, the planet carrier being in the form of a cage which is connected to a third coaxial shaft received within one of the first-mentioned coaxial shafts.

7. A vehicle according to claim 6 wherein the control coupling is connected between the first-mentioned coaxial shafts and the first and second elements are two sets of interleaved plates normal to the rotary axis of the coupling.

8. A vehicle including a prime mover, axles or axle parts drivable by the prime mover, a three-member differential gearing of epicyclic type including planet elements mounted in a planet carrier, a sun gear and an annulus gear, a control coupling connected between two-members of the gearing to control relative rotation between said members, the coupling including first and second elements relatively rotatable in a viscous fluid having a viscosity of between 1,000 and 100,000 centistokes at 20°C with a zero shear rate about a common axis, the elements being annular and spaced from said axis to provide a space thereabout and said differential gearing being located in said space, the first element being carried by said annulus gear; a driving connection between the second element and a member of the differential gearing other than the annulus gear and further driving connections between the vehicle prime mover and one member of the gearing and between the other members of the gearing respectively and either the parts of a single driven axle or two driven axles.

9. A vehicle according to claim 8 wherein said first element comprises a series of annular plates which are normal to the rotary axis of the control coupling and which are surrounded by a housing which carries a series of similar plates which form the second element of the control coupling, the plates of the two series being interleaved.

10. A vehicle according to claim 9 wherein the housing is of sealed construction except for a running seal between a shaft and a housing radially inwardly of said elements.

11. A vehicle according to claim 9 wherein the housing has an externally smooth profile.

12. A vehicle according to claim 8 wherein said first element comprises a plurality of cylindrical projections of different diameters which are interleaved with cylindrical projections carried by a housing which surrounds the annulus gear and which forms the second element of the coupling.

13. A vehicle including a prime mover, axles or axle parts drivable by the prime mover, a three-member differential gearing of epicyclic type including planet elements mounted in a planet carrier; a sun gear and an annulus gear, a control coupling connected between two-members of the gearing to control relative rotation between said members, the coupling including first and second elements relatively rotatable in a viscous fluid having a viscosity of between 1,000 and 100,000 centistokes at 20°C with a zero shear rate about a common axis, the elements consisting of the annulus gear and a housing within which the annulus gear rotates closely, a driving connection between the housing and a member of the differential gearing other than the annulus gear, and further driving connections between the vehicle prime mover and one member of the gearing and between the other members of the gearing respectively and either the parts of a single driven axle or two driven axles.

* * * * *